(No Model.)

E. FRANKLIN.
HAND CULTIVATOR.

No. 528,425. Patented Oct. 30, 1894.

WITNESSES:
Paul Johot
J. Fred. Acker

INVENTOR
E. Franklin
BY Munn & Co.
ATTORNEYS.

UNITED STATES PATENT OFFICE.

EDWARD FRANKLIN, OF BOSTON, GEORGIA.

HAND-CULTIVATOR.

SPECIFICATION forming part of Letters Patent No. 528,425, dated October 30, 1894.

Application filed May 8, 1894. Serial No. 510,479. (No model.)

*To all whom it may concern:*

Be it known that I, EDWARD FRANKLIN, of Boston, in the county of Thomas and State of Georgia, have invented a new and Improved Hand-Cultivator, of which the following is a full, clear, and exact description.

My invention relates to a hand cultivator or garden plow, and it has for its object to so construct the implement that the oblique downward pressure required in ordinary plows will be entirely dispensed with in operation, the implement simply requiring the application of force in a forward and horizontal direction. By this arrangement the wheel of the cultivator is relieved of the usual downward pressure and will travel easily over the ground, all the weight of the implement being sustained by the slide or heel of the plow, which latter is constructed to move evenly and smoothly upon the ground.

The invention consists in the novel construction and combination of the several parts, as will be hereinafter fully set forth, and pointed out in the claim.

Reference is to be had to the accompanying drawings, forming a part of this specification, in which similar figures and letters of reference indicate corresponding parts in both the views.

Figure 1:
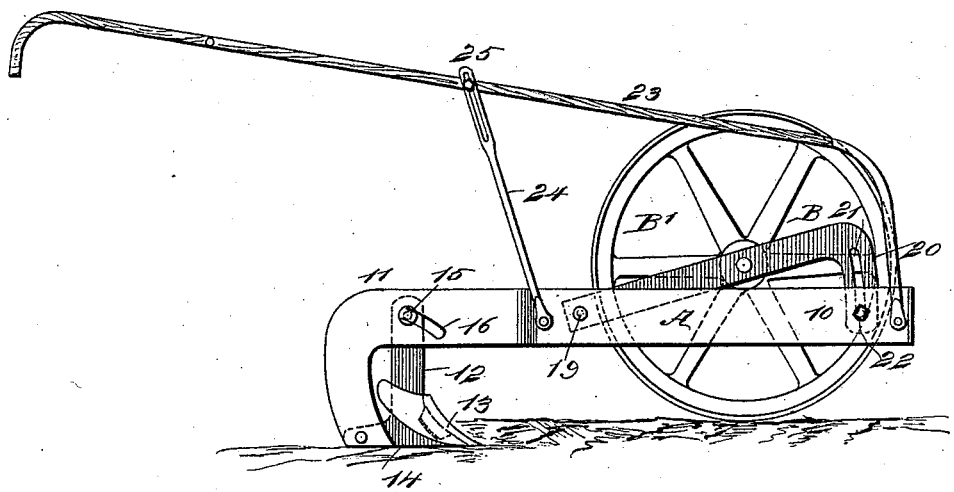
Figure 2:
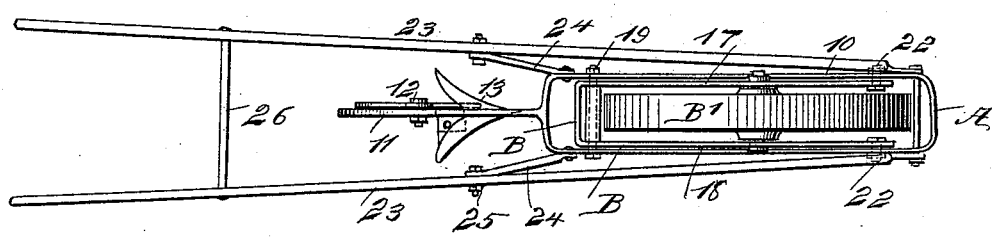

Figure 1 is a side elevation of the cultivator; and Fig. 2 is a plan view thereof.

In carrying out the invention the body frame A of the cultivator or garden plow consists of a horizontal loop section 10 and a rear shank section 11 of angular construction, which emanates from the central rear portion of the loop. The shank section 11, extends horizontally rearward from the loop section, and is then curved downward and forwardly in direction of the ground.

The plow shank 12 carries any desired form of cultivator blade 13, and the said plow shank at its lower end is provided with a rearwardly extending heel, and the bottom surface of the heel and body of the shank are made straight and smooth in order that they may slide readily on the ground, and the lower end or slide section of the vertical member of the frame A, is finished in the same manner and is in the same plane with the bottom of the heel. The heel of the plow shank is pivotally connected with the lower rear portion of the said frame A, and the shank extends upward to an engagement with the horizontal portion of the engagement with the said section of the frame by means of a set screw 15, passed through the shank and through a diagonal slot 16, produced in the frame. In this manner the shank may be adjusted so that the point of the plow or cultivator blade will enter the ground more or less deeply; but the regulating of the depth of plowing or cultivating is accomplished through the medium of a swinging frame B, and a wheel B' carried by the said frame.

The swinging frame B is contained usually and preferably within the loop section of the main frame A, and the said swinging frame comprises two members 17 and 18, which are parallel and connected at their rear ends, each member of the frame being provided with a vertical extension 20, said extension being carried in a downwardly direction, whereby each member of the swinging frame is more or less angular in cross section.

The closed end of the swinging frame is pivotally attached to the rear portion of the loop section of the main frame through the medium of a pivot pin 19; while in the extensions of the members of the swinging frame slots 21, are longitudinally produced; and the said slots receive set screws 22 carried by the loop section of the main frame A, whereby the forward end of the swinging frame may be given more or less of an elevation, or may be carried downward until it is substantially concealed within the loop.

The wheel B' heretofore referred to is pivoted in the straight portions of the members of the swinging frame, usually at or near the center of the latter; and the said wheel therefore extends both above and below the loop section of the main frame; and according to the adjustment of this wheel through the medium of the swinging frame the plow will enter the ground more or less deeply. If for example, the wheel is adjusted upward two inches above the level of the bottom of the plow the plow will produce a furrow two inches deep, or practically so. The draft of the plow is governed by the adjustment of its standard 12.

Handles 23 are connected with the forward end of the loop section of the main frame and extend rearwardly therefrom and rearwardly over the main frame. The handles 23 are adjustable as to height, or in order that they may suit the operator, through the medium of brace bars 24, which are pivoted to the main frame and adjustably connected with the handles through the medium of set screws 25 or their equivalents. The handles are connected and braced by means of a brace bar 26.

Owing to the construction above set forth the entire weight of the implement is upon the slide or heel of the plow, and therefore the wheel B' has no other function than the regulating of the depth at which the plow shall travel and move freely ahead, since in the operation of plowing the operator need not exert any downward pressure upon the implement either directly or obliquely, as the plow will guide itself in the ground, and the power necessary to drive the implement ahead will be exerted in a forwardly and horizontal direction only. Thus the implement is rendered exceedingly light running and may be constructed so as to have little weight itself, since all the parts are preferably constructed of metal with the exception of the handles proper, which may be of wood.

It will be understood also that the guide wheel B' and the frame carrying the same may be located outside of the main frame, which in that event may be made flat, the loop being omitted; or the swinging frame B may remain in the position shown in the drawings, and be made to carry two wheels, one located at each side of the loop section of the main frame.

Having thus described my invention, I claim as new and desire to secure by Letters Patent—

The combination, with the main frame having a downward extension at its rear end, and the support for the front end of the main frame, of a plow shank pivoted to the lower end of the said extension, and adjustably connected with the main frame adjacent to the upper end of the extension, substantially as described.

EDWARD FRANKLIN.

Witnesses:
J. J. PARRAMORE,
T. B. BARROW.